United States Patent
Moro

[15] 3,698,209
[45] Oct. 17, 1972

[54] JOINT DEVICE
[72] Inventor: Kazuo Moro, 55, Higashi Asakawa-machi, Tokyo, Japan
[22] Filed: Jan. 25, 1971
[21] Appl. No.: 109,517

[52] U.S. Cl. .................................. 64/12, 64/27 R
[51] Int. Cl. ................................... F16d 3/64
[58] Field of Search ......................... 64/11, 12, 27

[56] References Cited
UNITED STATES PATENTS
1,602,912  10/1926  Leipert .................. 64/12
1,734,988  11/1929  Wilson .................. 64/12

Primary Examiner—Edward G. Favors
Attorney—Pierce, Scheffler & Parker

[57] ABSTRACT

A joint device adapted to be used particularly in small apparatuses. Rotation torque of driving shaft is transmitted from a wheel fixed to said shaft to an opposed wheel fixed to driven shaft through a resilient wire alternately hung to respective one of said wheels substantially along their periphery.

6 Claims, 10 Drawing Figures

PATENTED OCT 17 1972 3,698,209

INVENTOR
Kazuo Moro,

Fig. 6
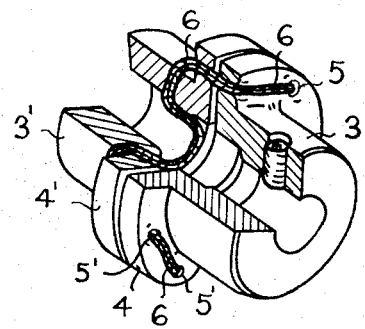
Fig. 8
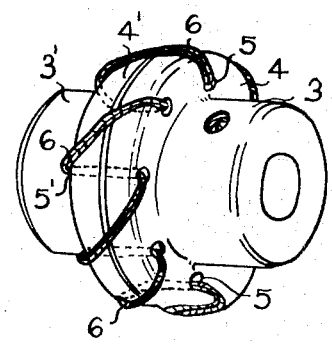
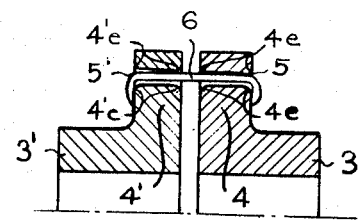
Fig. 7
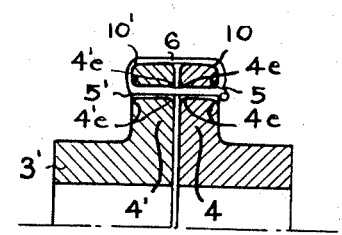
Fig. 9
INVENTOR.
Kazuo Moro

JOINT DEVICE

This invention relates to joint devices and, more particularly, to improvements in a joint device for transmitting a rotating torque from a driving shaft to a driven shaft in small apparatuses.

Joint devices of this kind of various structures have been already suggested. However, in case there is a level difference between the driving shaft and driven shaft, it will be difficult to smoothly transmit the rotating torque. In providing joint devices for overcoming this difficulty, there has been involved such a defect that the structure of the joint device becomes complicated. The present invention has been suggested to eliminate such defect.

A main object of the present invention is, thus, to provide a joint device of a simple structure to be used in the case that there is a level difference between a driving shaft and driven shaft.

Another object of the present invention is to provide a joint device in which internal friction loss is little in transmitting the power.

The present invention shall be explained in the following with reference to the accompanying drawings in which:

FIG. 6 is a cut-away perspective view of a device for parallel or zigzag knitting;

FIG. 7 is a fragmentary cross-sectional view of the device in FIG. 7;

FIG. 8 is similar to FIG. 6 but illustrates loop knitting; and

FIG. 9 is a fragmentary cross-sectional view of the device in FIG. 8.

Figure 1:
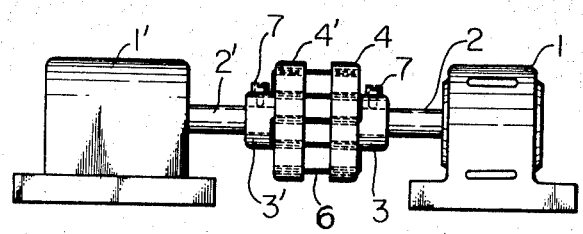
FIG. 1 is an elevation of a joint device of the present invention.
Figure 2:
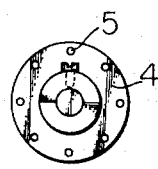
FIG. 2 is an elevation of a disk part forming a joint device of the present invention.
Figure 3:
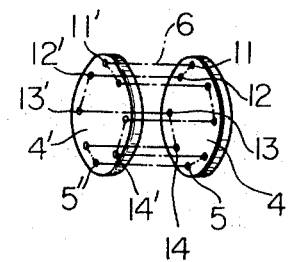
FIG. 3 shows a state of knitting a connecting wire.

In FIGS. 1 to 3, 1 is an electric motor or any other prime mover, 2 is a driving shaft of the above prime mover and 3 is a collar fixed to the driving shaft 2 by screwing or any other means. A plate-shaped part 4 on the driving side is combined integrally with the collar 3 and formed in a disk-shape in the illustrated case. Holes 5 are made parallel with the axial direction along the same periphery on said plate part 4 and at regular intervals, and peripheral edges of the respective holes 5 are smoothly roundly finished preferably at both side openings. A further plate-shaped part 4' is provided on the driven side, which having holes 5' made in the same manner as in the case of the driving side plate-shaped part 4. It is desirable that the number of the holes 5' and their intervals are substantially the same as those of the holes 5 in the driving side plate part 4. Said driven side plate part 4' is also combined integrally with a collar 3' which in turn is coupled to a driven shaft 2' inserted in a hole made in the collar 3' and fixed therein by means of a screw 7. Coupled to said driven shaft 2' is a gear or any other part 1' to be rotated by the prime mover 1. 6 is a cord comprising yarns of a low-elasticity synthetic resin twisted up, or a wire comprising a cord of the above kind inserted in a tube made of a synthetic resin. The cord or wire 6 is passed through the holes 5 in the driving side plate-shaped part 4 and through the holes 5' in the driven side plate-shaped part 4, the two groups of which holes 5 and 5' being arranged axially in alignment with each other, so that all the parts of the cord 6 passed between the both plate-shaped parts 4 and 4' will be straight and parallel with each other. For the synthetic resin used, such resin as, for example, tetrone is used and, preferably the cord 6 is impregnated with such a lubricating oil as silicon oil. An example of the way of passing the cord or wire 6 through the respective groups of the holes 5 and 5' is shown in FIG. 3. That is, if the holes 5 made in the plate-shaped part 4 are identified as 11, 12, 13, 14 . . . , respectively, and the holes 5' made in the plate-shaped part 4' are identified as 11', 12', 13', 14'. . ., respectively, then the wire 6 will be knitted, for example, in the order through 11–12–12'–13'–13–14–14'– . . . and is connected at the beginning end and ending end after passed through all of the holes.

It will be needless to say that when the cord 6 is led from one hole to adjacent one in the same plate member 4 or 4', for example, from a hole 11 to an adjacent hole 12, the cord 6 is made to run along a surface wall of the member 4 which is reverse to the surface opposing to the other member 4'.

Alternatively, the wire 6 may be knitted also in the order, for example, through 11'–11–12'–12–13'–13–14'–14– . . . so as to form a loop as a whole, and it will be also possible to fix the beginning end to the plate-shaped part 4 and to fix the ending end to the other plate-shaped part 4. In this case, when the cord 6 is folded back from one plate-shaped part toward the other plate-shaped part, the cord is led outwardly along peripheral surface of the part and then brought diagonally into a hole of the other part, which whole is in the adjacent relationship to the one from which the cord is folded back.

In the above-described embodiment of the alternative way of "knitting," it is preferable to have peripheral corners of the plate-shaped parts 4 and 4' smoothed so as to be round in section, at least at one of the corners which is reverse to the corner facing to the other one of the parts 4 and 4', so that the cord 6 is readily slidable at the corners in the same manner as in the case at the peripheral edges of the holes 5, 5'.

In the present invention, as described above, the plate-shaped part 4 on the driving side and the plate-shaped part 4' on the driven side are connected with each other through the knitted cord 6. Therefore, even if there is a level difference between the driving shaft 2 and the driven shaft 2', the rotation of the plate-shaped part 4 on the driving side will be able to be smoothly transmitted to the plate-shaped part 4' on the driven side.

Further, since the cord or wire 6 has a low elasticity, its longitudinal expansion caused at the time when the motor is rotated is limited to be only a small amount and, further, such expansion is substantially uniformly distributed over the whole length of the cord as the same is slidable at the smoothed peripheral edges of the respective holes 5 and 5', as well as at the smoothed peripheral corners of the plate-shaped parts 4, 4', so that the tension of the cord 6 is substantially uniform throughout its length. For these reasons, the force applied to the both plate-shaped parts is made to be uniform and consequently the rotary force is transmitted smoothly.

Figure 4:
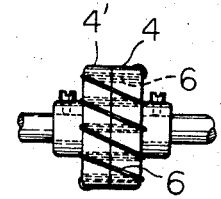
FIG. 4 shows another embodiment of the present invention.

FIG. 4 shows another embodiment of the present invention, in which the device is used in the case where the level difference between the driving and driven sides is small or substantially negligible. In this case, the plate-shaped members 4 and 4' are brought substantially into close contact with each other at their opposing faces, and the cord 6 is knitted in the above-mentioned alternative method, that is, by being passed through the holes in the both plate-shaped members 4 and 4', then on the outsides of the members 4 and 4' and again through other adjacent holes in the plate members 4 and 4'. It will be needless to say that the respective peripheral corners of the members 4 and 4' facing to the motor 1 and the load 1' are preferably made to be smoothly round in section so that the cord 6 is readily slidable at the corners when expanded. Such "knitting" method is advantageous specifically in the case of this embodiment, since the outwardly and diagonally exposed parts of the cord 6 around the peripheral corners and surfaces of the members 4 and 4' will strengthen the coupling between the both members, while the slidable limited expansion of the cord is maintained.

Figure 5A:
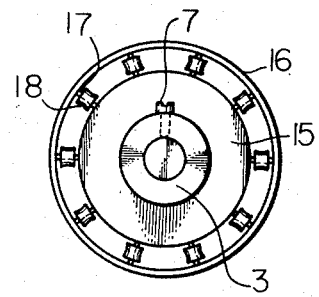
FIGS. 5A and 5B show a further embodiment of the present invention.
Figure 5B:
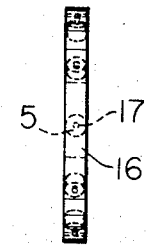

FIG. 5 shows another embodiment of the present invention, in which the structures of the plate-shaped parts on the driving side and driven side are different from those shown in FIGS. 1 to 4, and, therefore, rollers are rotatably provided in the plate-shaped parts.

In FIG. 5, 18 is a plurality of rollers respectively fitted rotatably on a shaft 17 provided in a space between a plate body 15 of the plate-shaped part and a ring-shaped peripheral part 16. That is, such rollers 18 are radially and rotatably fitted at substantially regular intervals near the peripheral edge part. Further, the plate-shaped part on the driving side and the plate-shaped part on the driven side in this embodiment may well be of the same structure. The cord or wire to be used is the same as in the case of FIGS. 1 to 4 and is knitted in the same manner as in the case of FIG. 3 around the rollers. In this embodiment, with the rotation of the rollers, the frictional resistance between the cord or wire and the plate-shaped parts can be reduced and, thus, the internal loss in the case of transmitting a power from the driving side to the driven side can be remarkably reduced.

FIGS. 6 and 7 illustrate apparatus features of the invention pertinent to parallel or zigzag knitting, whilst FIGS. 8 and 9 relate to apparatus features relating to loop knitting. FIG. 7 emphasizes the fact that the edges 4e and 4'e of the apertures are rounded. Similarly, FIG. 9 emphasizes that the edges 4e and 4'e of the apertures are rounded and that the corners 10, 10', of the parts 4, 4' likewise are rounded.

I claim:

1. A joint device comprising a pair of opposing wheels respectively coupled to a driving shaft and a driven shaft, and a cord having a low elasticity for transmitting rotation of said wheel on driving side to the other wheel on driven side, said cord comprising a plurality of yarns of a synthetic resin twisted up and having a low elasticity, and each of said wheels having a plurality of means arranged substantially at a regular interval along its periphery for hanging said cord slidably thereon alternately from one wheel to the other.

2. A joint device according to claim 1 wherein said means for hanging said cord being a plurality of rollers fixed to the wheels with radially extending axes.

3. A joint device according to claim 1 wherein said cord is inserted in a synthetic resin tube of a low elasticity.

4. A joint device according to claim 1 wherein said yarns consist of tetrone.

5. A joint device according to claim 1 wherein said cord is impregnated with a lubricating oil.

6. A joint device according to claim 5 wherein said oil is silicon oil.

* * * * *